United States Patent
Zhao et al.

(10) Patent No.: US 9,716,888 B2
(45) Date of Patent: Jul. 25, 2017

(54) VIDEO PROCESSING WITH STATIC AND DYNAMIC REGIONS AND METHOD FOR USE THEREWITH

(71) Applicant: ViXS Systems, Inc., Toronto (CA)

(72) Inventors: Xu Gang Zhao, Maple (CA); Xinghai Li, North York (CA)

(73) Assignee: VIXS SYSTEMS, INC., Toronto (CA)

( * ) Notice: Subject to any disclaimer, the term of this patent is extended or adjusted under 35 U.S.C. 154(b) by 367 days.

(21) Appl. No.: 14/225,981

(22) Filed: Mar. 26, 2014

(65) Prior Publication Data

US 2015/0281698 A1 Oct. 1, 2015

(51) Int. Cl.
| | |
|---|---|
| H04N 19/23 | (2014.01) |
| H04N 19/137 | (2014.01) |
| H04N 19/12 | (2014.01) |
| H04N 19/167 | (2014.01) |
| H04N 19/119 | (2014.01) |

(52) U.S. Cl.
CPC ........... *H04N 19/137* (2014.11); *H04N 19/12* (2014.11); *H04N 19/23* (2014.11); *H04N 19/119* (2014.11); *H04N 19/167* (2014.11)

(58) Field of Classification Search
CPC ..... H04N 19/137; H04N 19/167; H04N 19/23
USPC .................................................. 375/240.02
See application file for complete search history.

(56) References Cited

U.S. PATENT DOCUMENTS

| | | | | |
|---|---|---|---|---|
| 4,984,076 A | * | 1/1991 | Watanabe | ............ H04N 19/176 375/240.2 |
| 5,038,209 A | * | 8/1991 | Hang | .................... H04N 19/172 375/240.05 |
| 5,136,376 A | * | 8/1992 | Yagasaki | .............. H04N 9/8042 375/240.12 |
| 5,333,012 A | * | 7/1994 | Singhal | ................. H04N 19/176 375/240.04 |
| 5,410,351 A | * | 4/1995 | Kojima | ................... H04N 19/61 375/240.05 |
| 5,485,279 A | * | 1/1996 | Yonemitsu | ........... H04N 19/577 375/240.02 |
| 5,953,050 A | * | 9/1999 | Kamata | .................. H04N 7/148 348/14.05 |
| 6,023,298 A | * | 2/2000 | Hwang | .................. H04N 19/51 348/699 |

(Continued)

OTHER PUBLICATIONS

Peixoto et al, AN H.264/AVC to HEVC Video Transcoder Based on Mode Mapping, 2013.*

(Continued)

*Primary Examiner* — Shan Elahi
(74) *Attorney, Agent, or Firm* — Garlick & Markison; Bruce E. Stuckman (57) ABSTRACT

A system for processing a video signal includes a static region identification and separation module for generating static region image data corresponding to a static region of the video signal, for generating dynamic region video data corresponding to at least one dynamic region in the video signal and for generating dynamic region location data that indicates at least one location corresponding to the at least one dynamic region in the video signal. A static region encoding module image encodes the state region image data to produce encoded static region data. A video encoder section generates at least one encoded video signal by compressing the dynamic region video data.

14 Claims, 10 Drawing Sheets

(56) References Cited

U.S. PATENT DOCUMENTS

| | | | | |
|---|---|---|---|---|
| 6,118,902 A * | 9/2000 | Knowles | ............... | G06F 17/14 375/E7.03 |
| 6,356,592 B1 * | 3/2002 | Naito | ............... | H04N 19/176 375/240.29 |
| 7,082,165 B2 * | 7/2006 | Uenoyama | ............... | G06T 9/00 375/240 |
| 7,324,699 B2 * | 1/2008 | Chen | ............... | H04N 19/60 375/E7.144 |
| 8,885,706 B2 * | 11/2014 | Bankoski | ............... | G06T 5/002 375/240.01 |
| 2001/0014122 A1 * | 8/2001 | Fu | ............... | H04N 21/234336 375/240.12 |
| 2007/0025447 A1 * | 2/2007 | Kojokaro | ............... | H04N 19/139 375/240.24 |
| 2007/0122786 A1 * | 5/2007 | Relan | ............... | G09B 19/00 434/308 |
| 2007/0222887 A1 * | 9/2007 | Duncan | ............... | H04N 5/23241 348/372 |
| 2007/0223579 A1 * | 9/2007 | Bao | ............... | H04N 19/176 375/240.12 |
| 2007/0253488 A1 * | 11/2007 | Kitamura | ............... | H04N 7/50 375/240.16 |
| 2009/0027519 A1 * | 1/2009 | Nishiwaki | ............... | G06T 5/002 348/241 |
| 2009/0102686 A1 * | 4/2009 | Fukuhara | ............... | H04N 19/647 341/67 |
| 2011/0222605 A1 * | 9/2011 | Kashiwagi | ............... | H04N 19/597 375/240.16 |
| 2012/0195370 A1 * | 8/2012 | Guerrero | ............... | H04N 19/196 375/240.02 |
| 2013/0064289 A1 * | 3/2013 | Chernyshev | ............... | H04N 19/147 375/240.03 |

OTHER PUBLICATIONS

Barzilay et al, Subjective Quality Analysis of Bit Rate Exchange Between Temporal and SNR Scalability in the MPEG4 Extenion, 2007.*

Kondo et al, A Motion Compensation Technique Using Sliced Blocks in Hybrid Video Coding, 2005.*

* cited by examiner

VIDEO PROCESSING WITH STATIC AND DYNAMIC REGIONS AND METHOD FOR USE THEREWITH

TECHNICAL FIELD OF THE DISCLOSURE

The present disclosure relates to encoding and decoding used in devices such as video encoders/codecs.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to higher resolution and better picture quality. Standards have been promulgated for many encoding methods including the H.264 standard that is also referred to as MPEG-4, part 10 or Advanced Video Coding (AVC). While this standard sets forth many powerful techniques, further improvements are possible to improve the performance and speed of implementation of such methods.

DETAILED DESCRIPTION OF THE DISCLOSURE INCLUDING THE PRESENTLY PREFERRED EMBODIMENTS

Figure 1:
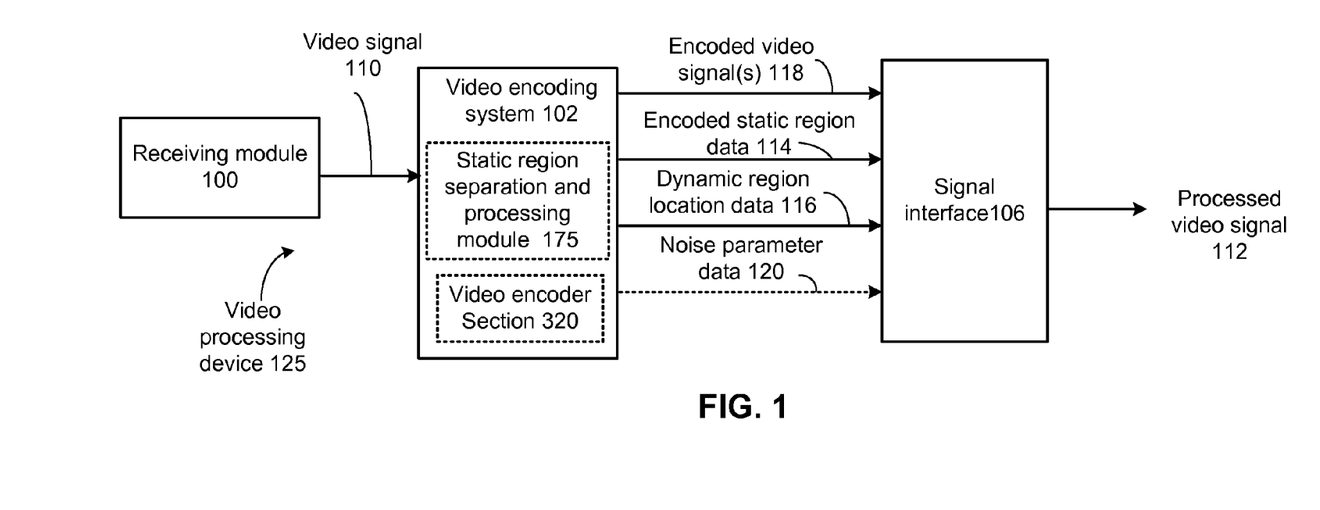
FIG. 1 presents a block diagram representation of a video processing device 125 in accordance with an embodiment of the present disclosure.

FIG. 1 presents a block diagram representation of a video processing device 125 in accordance with an embodiment of the present disclosure. In particular, video processing device 125 includes a receiving module 100, such as a set-top box, television receiver, personal computer, cable television receiver, satellite broadcast receiver, broadband modem, 3G transceiver or other information receiver or transceiver or signal interface that is capable of receiving video signals 110 from one or more sources such as a broadcast cable system, a video camera, a home security system, a video conferencing system, a broadcast satellite system, the Internet, a digital video disc player, a digital video recorder, or other video source. Video encoding system 102 is coupled to the receiving module 100 to encode, transrate and/or transcode one or more of the video signals 110 to form processed video signal 112.

In an embodiment of the present disclosure, the video signals 110 can include a broadcast video signal, such as a television signal, high definition television signal, enhanced high definition television signal or other broadcast video signal that has been transmitted over a wireless medium, either directly or through one or more satellites or other relay stations or through a cable network, optical network or other transmission network. In addition, the video signals 110 can be locally or remotely generated from a video camera, a stored video file, played back from a recording medium such as a magnetic tape, magnetic disk or optical disk, and can include a streaming video signal that is transmitted over a public or private network such as a local area network, wide area network, metropolitan area network or the Internet. The video signal 110 can include a digital video signal that is formatted in any of a number of video formats.

A static region separation and processing module 175 operates to analyze the video content of video signal 110 and separate it into a non-changing (static) part and one or more changing (dynamic) parts. The static and dynamic parts are coded using different methods and can be transmitted at different bit rates either together or separately to reduce the overall video bitrate while keeping the same or similar video quality.

In an embodiment, the static region separation and processing module 175 generates encoded static region data 114 corresponding to a static region of the video signal 110 and also generates dynamic region location data 116 that indicates at least one location corresponding to the at least one dynamic region in the video signal 110. The video encoder section generates at least one encoded video signal 118 by compressing the dynamic region video data.

The encoded video signals(s) 118 can include one or more video signals corresponding to one or more dynamic regions of the video signal. The encoded video signal(s) 118 can be formatted in accordance with a digital video codec standard such as H.264, MPEG-4 Part 10 Advanced Video Coding (AVC), H.265 or other digital format such as a Moving Picture Experts Group (MPEG) format (such as MPEG1, MPEG2 or MPEG4), Quicktime format, Real Media format, Windows Media Video (WMV) or Audio Video Interleave (AVI), or another digital video format, either standard or proprietary.

The static region separation and processing module 175 optionally generates static region image data by noise filtering the static region of the video signal 110 and further generates noise parameter data 120 that characterizes noise present in the static region of the video signal. The static region image data can be encoded in accordance with an image compression format such as JPEG, TIG, GIF, or other image compression format.

While portions of the processed video signal 112, such as the encoded video signals 118 and encoded static region data 114, can be encoded in accordance with standard video and image processing methodologies, respectively, the overall methodology for producing the processed video signal 112 from the video signal 110 can be itself non-standard as described in the present disclosure.

The signal interface 106 generates a processed video signal 112 by multiplexing the encoded static region data 114, the dynamic region location data 116, and the at least one encoded video signal 118—optionally to include noise parameter data 120.

The operation of video encoding system 102 can be described in conjunction with the following examples that include several optional functions and features. Consider a video application in which motion in the picture (if there is any) takes place before a fixed non-changing background (e.g. video surveillance, video conference). The video content can be separated into the non-changing background and the changing forefront part. The background images are transmitted to the receiving end only once at the beginning of a session, during set-up and association of remote devices—e.g. when changes occur due to camera movement, or periodically such as once every minute, once every N minutes where N is greater than 1 or otherwise at a much lower frequency than the frame rate of the video. Further, if there is camera motion, the camera motion and angle parameters can be transmitted to the receiving end and the receiver can reconstruct the background part of the video according to the background images and the camera motion parameters. The transmitting end analyzes the video and detects the forefront activities. It crops or otherwise separates the dynamic regions of the video signal, encodes these portions and transmits them at reduced resolution compared to the original full-sized video. The receiving end can combine the two parts and reconstruct the full-sized video.

In addition, for noisy video contents (e.g. speckle noise due to low-light capturing, film-grain noise), the video can be separated into noise and clean part by noise filtering; the noise video can be modeled and the parameters can be estimated at the transmitting end and sent to the receiving end separately; due to the reduced noise, the clean video can be encoded at reduced bitrate while keeping the same quality. In this fashion processed video signal 112 can include data that represents the non-changing part (background images, camera motion parameters and noise parameters) transmitted to the receiving end through user data information or along with the encoded video signal(s) 118. When one or more dynamic regions are detected in the video signal 110—i.e. when the video signal 110 is not entirely static, activity detection data can also be generated and included in the processed video signal 112 for transmission to the to the receiving end and used by the system for other purposes (e.g. in surveillance system, generating an alert if the activity is detected, in a video conferencing system to indicate that a remote station is active, etc.).

While the foregoing has discussed the transmission of a processed video signal 112 to a remote device, the processed video signal 112 can also be stored. In particular, the techniques employed by video encoding system 102 can be used to reduce the storage requirements of the video signal 110.

Further discussion of the video processing device 125 including several optional functions and features are presented in conjunction with FIGS. 2-19 that follow.

Figure 2:
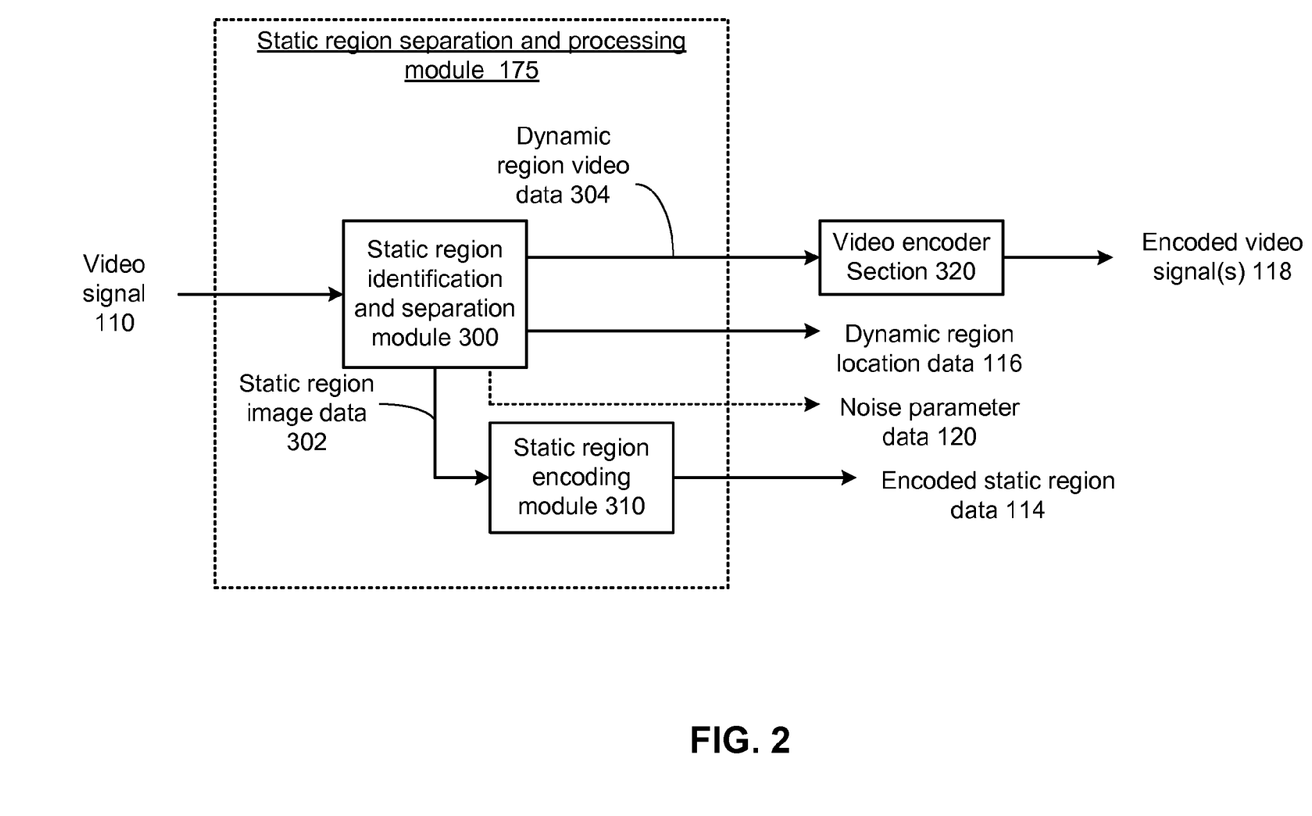
FIG. 2 presents a block diagram representation of a static region separation and processing module 175 in accordance with an embodiment of the present disclosure.

FIG. 2 presents a block diagram representation of a static region separation and processing module 175 in accordance with an embodiment of the present disclosure. In particular, the static region separation and processing module 175 includes a static region identification and separation module 300 for generating static region image data 302 corresponding to a static region of the video signal 110, for generating dynamic region video data 304 corresponding to at least one dynamic region in the video signal and for generating dynamic region location data 116 that indicates at least one location corresponding to the at least one dynamic region in the video signal 110. The static region encoding module 310 image encodes the static region image data 302 to produce encoded static region data 114. The video encoder section generates at least one encoded video signal 118 by compressing the dynamic region video data 304.

As discussed in conjunction with FIG. 1, the encoded static region data 114 can be formatted in accordance with a standard image compression format and encoded video signal(s) 118 can be encoded in conjunction with a standard video compression format—different from the image compression format. Further, the static region identification and separation module 300 optionally generates the static region image data 302 by noise filtering the static region of the video signal 110 and further generates noise parameter data 120 that characterizes noise present in the static region of the video signal 110.

Figure 3:
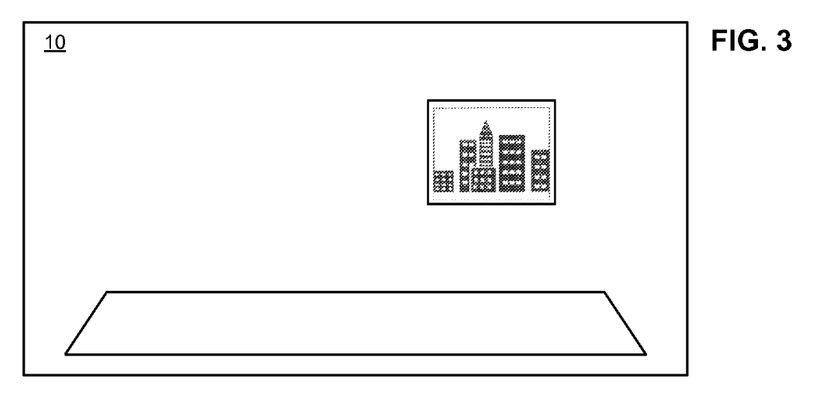
FIG. 3 presents a pictorial representation of a picture 10 in accordance with an embodiment of the present disclosure.

FIG. 3 presents a pictorial representation of a picture 10 in accordance with an embodiment of the present disclosure. In particular, an example picture of video signal 110 is presented that is generated by a video camera in conjunction with a video conference. The picture 10 represents an empty conference room. Because the video signal 110 includes only a static image and no motion, the video encoding system 102 generates processed video signal 112 that includes only encoded static region data 114 that is generated by image compression of the picture 10. When there is no activity, as shown, there is no need to send either dynamic region location data 116 or encoded video signal(s) 118 and the encoded static region data 114 need not be retransmitted.

Figure 4:
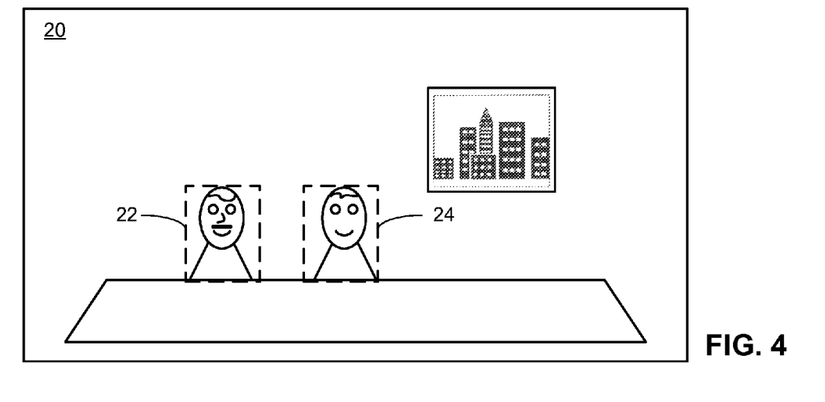
FIG. 4 presents a pictorial representation of a picture 20 in accordance with an embodiment of the present disclosure.

FIG. 4 presents a pictorial representation of a picture 20 in accordance with an embodiment of the present disclosure. In particular, a picture is presented that continues at a time subsequent to picture 10 presented in conjunction with FIG. 3. In this picture, two persons have arrived for the video conference. The static region identification and separation module 300 determines that two dynamic regions 22 and 24 are now present based on an analysis of motion in the video signal 110 in the regions 22 and 24. In response, the static region identification and separation module 300 crops or otherwise separates the video in the regions 22 and 24 to generate dynamic region video data 304 corresponding to the video signal 110 in these two regions 22 and 24 and optionally generates activity data that indicates that activity has now occurred.

Figure 5:
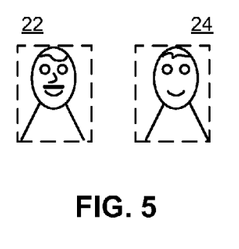
FIG. 5 presents a pictorial representation of two dynamic regions in accordance with an embodiment of the present disclosure.

FIG. 5 presents a pictorial representation of two dynamic regions in accordance with an embodiment of the present disclosure. In particular, two dynamic regions 22 and 24 are presented that are extracted from picture 20 presented in conjunction with FIG. 4. As discussed, the static region identification and separation module 300 crops or otherwise separates the video in the regions 22 and 24 to generate dynamic region video data 304 corresponding to the video signal 110 in these two regions 22 and 24 and further dynamic region location data 116 that indicates the positioning of the regions 22 and 24 in the picture 20 via one or more pixel coordinates. In the case, as shown where the dynamic regions 22 and 24 are simple rectangles, the dynamic region location data 116 can indicate coordinates corresponding to one or more vertices of these rectangles. It should also be noted, that the dynamic regions 22 and 24 can be cropped via one or more linear or nonlinear segments that define each dynamic region. In this case, additional data in the form of segment coordinates and/or other segment parameters can be included in the dynamic region location data 116 in order to describe the shape and location of each dynamic region.

The dynamic region video data corresponding to the dynamic regions 22 and 24 can be encoded by video encoder section 320 to generate two corresponding encoded video signals 118. Given their smaller size when compared with the entire picture 20, the bit rate required to transmit these encoded video signals 118 is reduced.

Figure 6:
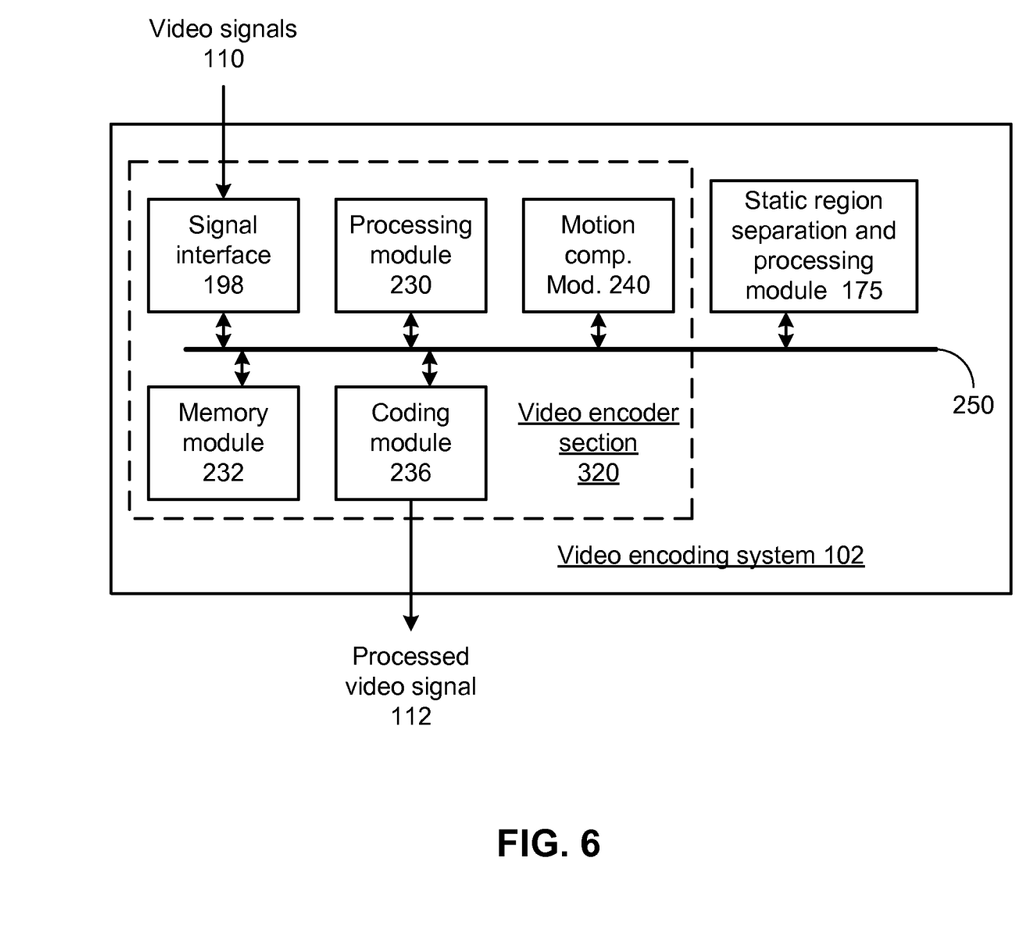
FIG. 6 presents a block diagram representation of a video encoding system 102 in accordance with an embodiment of the present disclosure.

FIG. 6 presents a block diagram representation of a video encoding system 102 in accordance with an embodiment of the present disclosure. In particular, video encoding system 102 operates in accordance with many of the functions and features of the H.264 standard, the H.265 standard, the MPEG-4 standard, VC-1 (SMPTE standard 421M) or other standard, to encode input video signals 110 that are received via a signal interface 198.

The video encoding system 102 includes a video encoder section 320 having signal interface 198, processing module 230, motion compensation module 240, memory module 232, and coding module 236. Processing module 230, and memory module 232 are coupled, via bus 250, to the signal interface 198 and a plurality of other modules, such as static region separation and processing module 175, motion compensation module 240 and coding module 236. While a particular bus architecture is shown, alternative architectures using direct connectivity between one or more modules and/or additional busses can likewise be implemented in accordance with the present disclosure.

In operation, motion compensation module 240 and coding module 236 operate to produce a compressed video stream based on a video stream from one or more video signals 110. Motion compensation module 240 operates on a plurality of macroblocks of each frame or field of the video stream generating residual luma and/or chroma pixel values corresponding to the final motion vector for each macroblock. Coding module 236 generates processed video signal 112 by transforming coding and quantizing the residual pixel values into quantized transformed coefficients that can be further coded, such as by entropy coding, filtered by a de-blocking filter and transmitted and/or stored as the processed video signal 112.

Figure 7:
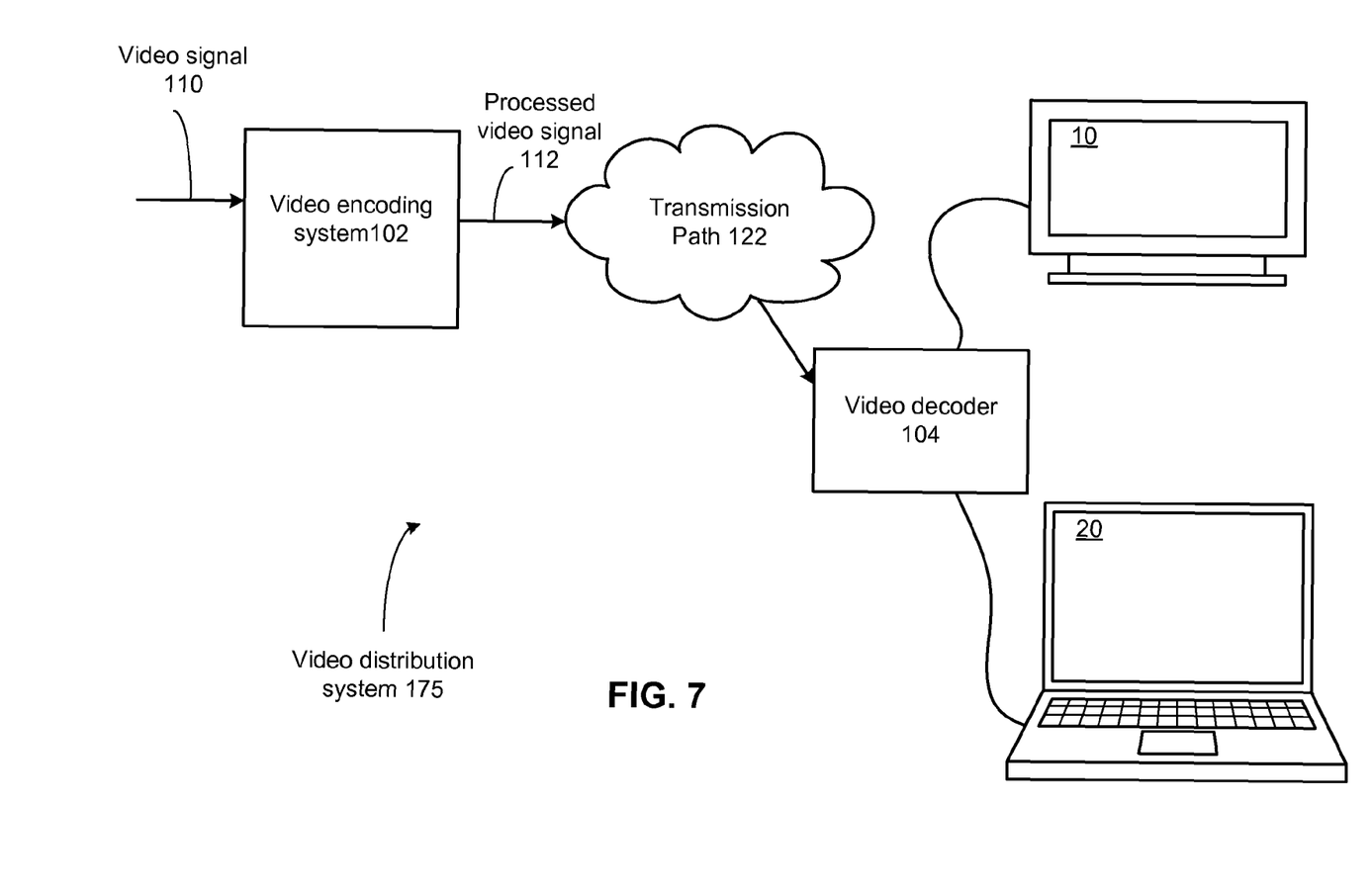
FIG. 7 presents a block diagram representation of a video distribution system 175 in accordance with an embodiment of the present disclosure.

FIG. 7 presents a block diagram representation of a video distribution system 175 in accordance with an embodiment of the present disclosure. In particular, processed video signal 112 is transmitted via a transmission path 122 to a video decoder 104. Video decoder 104, in turn can operate to decode the processed video signal 112 for display on a display device such as television 15, computer 25 or other display device.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol, an IP protocol or other high speed protocol.

Figure 8:
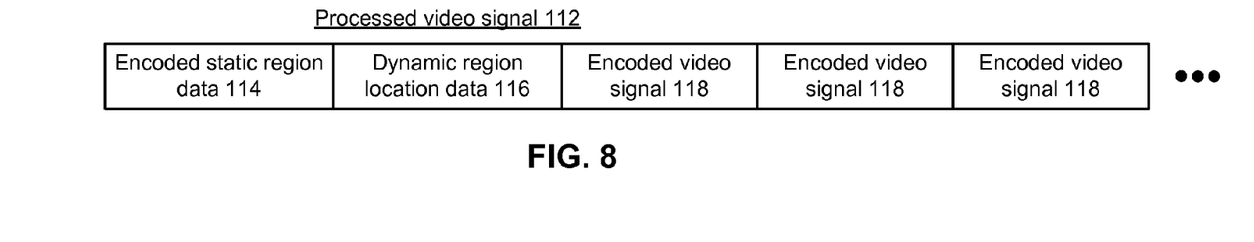
FIG. 8 presents a temporal representation of processed video signal 112 in accordance with an embodiment of the present disclosure.

FIG. 8 presents a temporal representation of processed video signal 112 in accordance with an embodiment of the present disclosure. While in other embodiments, the constituent signals of processed video signal 112 can be transmitted separately for decoding, the embodiment shown, the processed video signal 112 is generated for transmission by multiplexing the encoded static region data 114, the dynamic region location data 116, and the at least one encoded video signal 118—optionally to include noise parameter data 120. As further discussed, the encoded static region data 114 can be generated only once at the beginning of a session, during set-up and association of remote devices—e.g. when changes occur due to camera movement, or periodically such as once every minute, once every N minutes where N is greater than 1 or otherwise at a much lower frequency than the frame rate of the video contained in encoded video signals 118.

In addition, the dynamic region location data 116 can be generated and sent only when changes in these regions occur. Considering again an example where the video signal 110 corresponds to a video conference, the dynamic region location data 116 can be generated and included in the processed video signal 112 when persons enter or leave the scene, or when they otherwise move positions. During time periods when the number and positions of the dynamic regions are stable, the processed video signal 112 can exclusively include encoded video signals 118.

Figure 9:
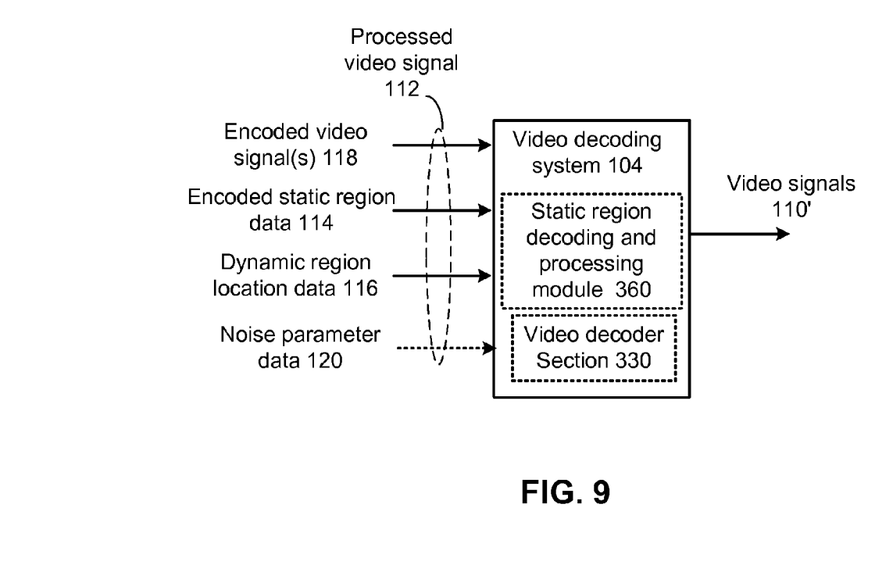
FIG. 9 presents a block diagram representation of a video decoding system 104 in accordance with an embodiment of the present disclosure.

FIG. 9 presents a block diagram representation of a video decoding system 104 in accordance with an embodiment of the present disclosure. In particular, a video decoding system 104 is presented for reproducing video signal 110 from processed video signal 112 as video signal 110'. In this context, the differences in video signal 110 and video signal 110' are attributable only to losses in encoding and transmission.

The video decoding system 104 includes a video decoder, such as video decoder section 330, that reproduces the dynamic region video data from the encoded video signal(s) 118. A static region decoding and processing module 360 reproduces the static region image data from the encoded static region data 114 and also superimposes the dynamic region video data on the static region image data in accordance with the dynamic region location data 116 to generate the reproduced video signal 110'.

Figure 10:
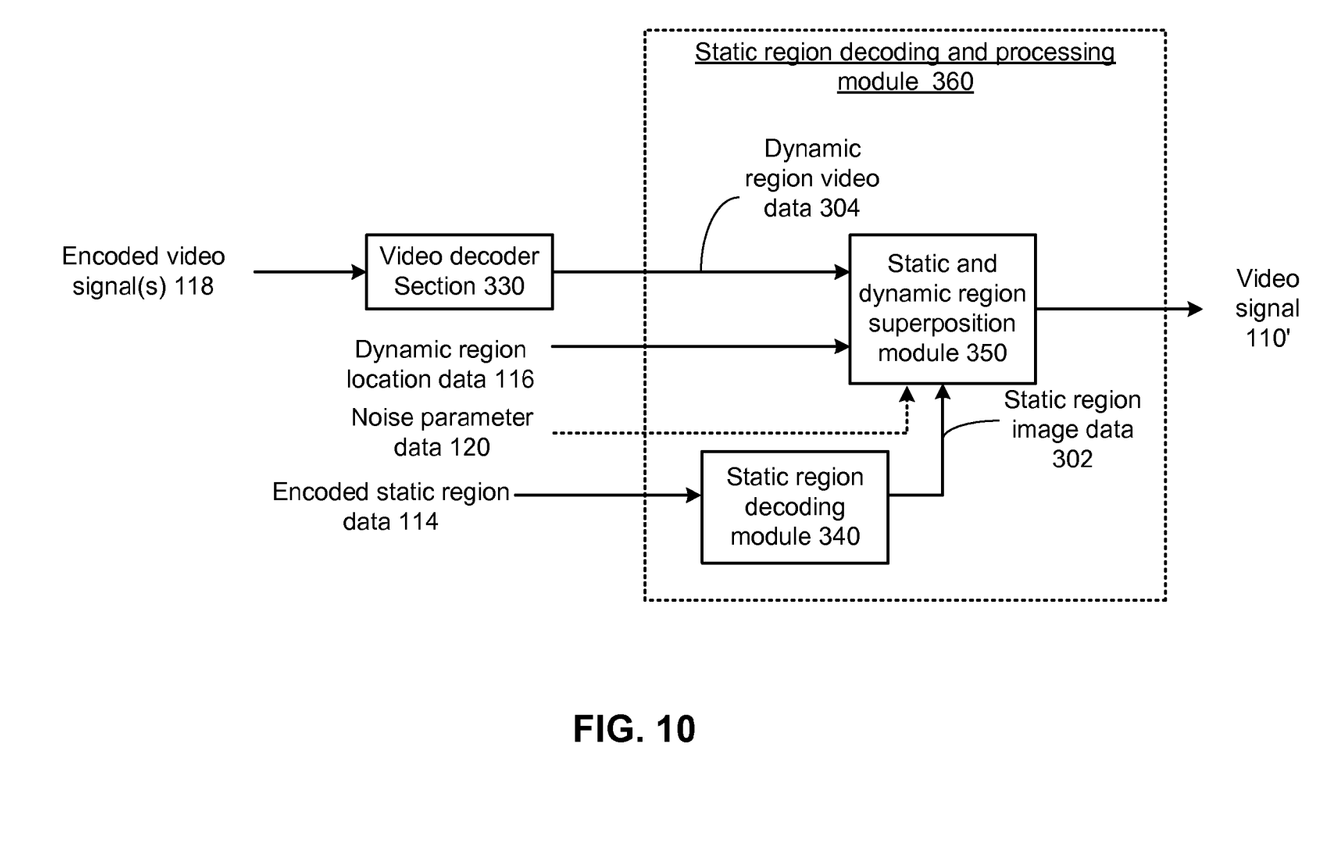
FIG. 10 presents a block diagram representation of a static region decoding and processing module 360 in accordance with an embodiment of the present disclosure.

FIG. 10 presents a block diagram representation of a static region decoding and processing module 360 in accordance with an embodiment of the present disclosure. The video decoder section 330 reproduces the dynamic region video data 304 from the encoded video signal(s) 118 by a decoding operation that operates as the inverse of the encoding operation performed by video encoder section 320. A static region decoding module 340 reproduces the static region image data 302 from the encoded static region data 114 via an inverse of the encoding operation performed by static region encoding module 310. The static and dynamic region superposition module 350 superimposes the dynamic region video data on the static region image data in accordance with the dynamic region location data. In particular, the dynamic region location data 116 is used to determine the position and/or shape of the dynamic region or regions that are present. The static and dynamic region superposition module 350 generates the video signal 110' by overlaying or otherwise superimposing the dynamic region video data 304 for each dynamic region in the proper position on the static region image data 302.

Figure 11:
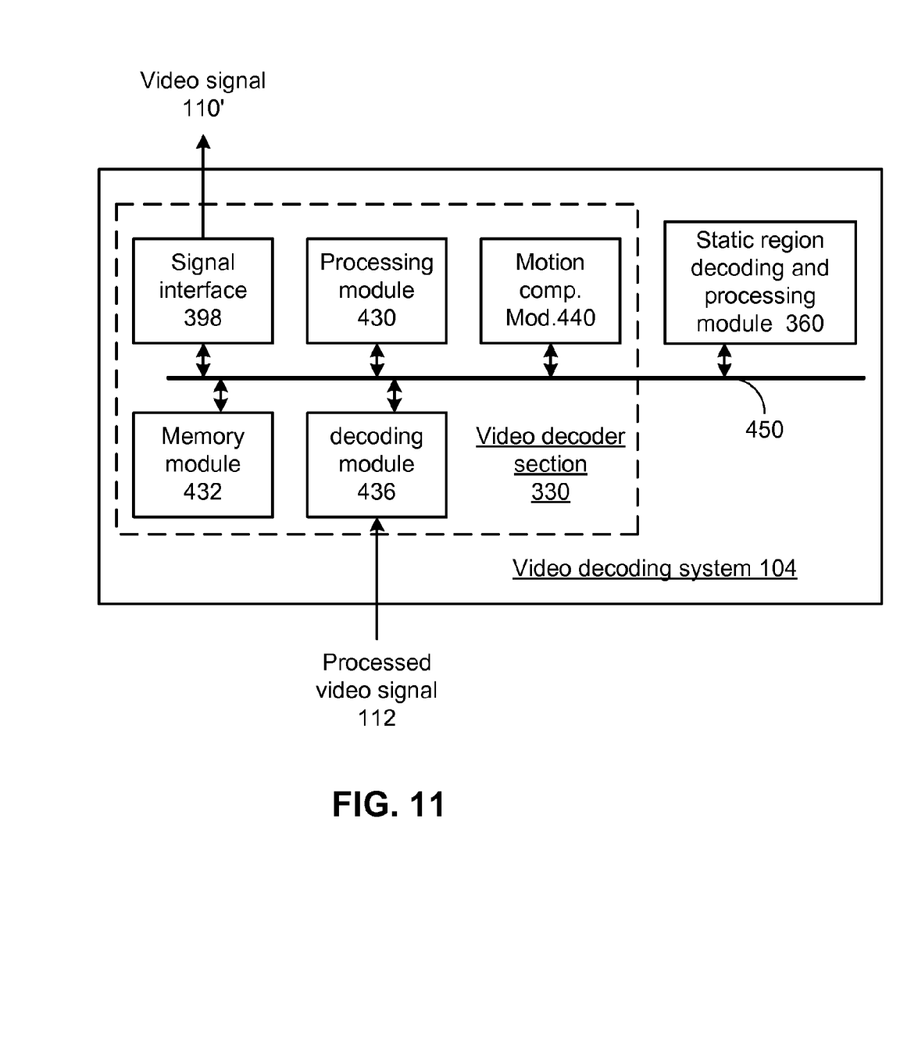
FIG. 11 presents a block diagram representation of a video decoding system 104 in accordance with an embodiment of the present disclosure.

FIG. 11 presents a block diagram representation of a video decoding system 104 in accordance with an embodiment of the present disclosure. In particular, video decoding system 104 operates in accordance with many of the functions and features of the H.264 standard, the H.265 standard, the MPEG-4 standard, VC-1 (SMPTE standard 421M) or other standard, to encode input video signals 110 that are received via a signal interface 198.

The video decoding system 104 includes a video decoder section 330 having signal interface 398, processing module 430, motion compensation module 440, memory module 432, and decoding module 436. Processing module 430, and memory module 432 are coupled, via bus 450, to the signal interface 398 and a plurality of other modules, such as static region decoding and processing module 360, motion compensation module 440 and decoding module 436. It should also be noted that the software implementations of the present disclosure can be stored on a tangible storage medium such as a magnetic or optical disk, read-only memory or random access memory and also be produced as an article of manufacture. While a particular bus architecture is shown, alternative architectures using direct connectivity between one or more modules and/or additional busses can likewise be implemented in accordance with the present disclosure.

The motion compensation module 440 and decoding module 436 operate to produce an uncompressed video signal 110' based the processed video signal 112. In particular, the motion compensation module 440 and decoding module 436 operate to reverse the encoding process performed by video encoder section 320. For example, decoding module 436 operates on processed video signal 112 via such operations as entropy decoding and by inverse transforming coding and dequantizing to generate residual pixel values. Motion compensation module 440 operates on a plurality of macroblocks of each frame or field of the video stream to convert the residual luma and/or chroma pixel values corresponding to the motion vectors for each macroblock into reconstructed picture data.

Figure 12:
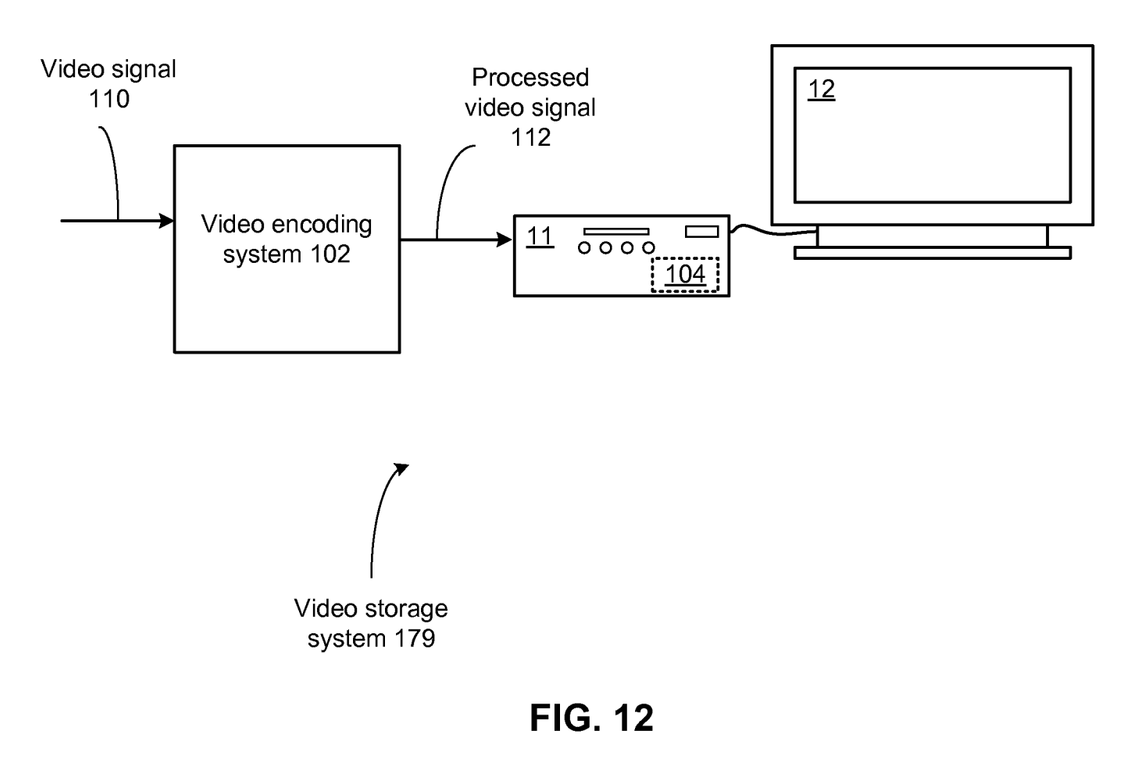
FIG. 12 presents a block diagram representation of a video storage system 179 in accordance with an embodiment of the present disclosure.

FIG. 12 presents a block diagram representation of a video storage system 179 in accordance with an embodiment of the present disclosure. In particular, device 11 is a set top box with built-in digital video recorder functionality, a stand alone digital video recorder, a DVD recorder/player or other device that stores the processed video signal 112 and includes video decoder 104 that produces video signal 110' for display on video display device such as television 12. While video encoding system 102 is shown as a separate device, it can further be incorporated into device 11. While these particular devices are illustrated, video storage system 179 can include a hard drive, flash memory device, computer, DVD burner, or any other device that is capable of generating, storing, decoding and/or displaying the video signal 110' in accordance with the methods and systems described in conjunction with the features and functions of the present disclosure as described herein.

Figure 13:
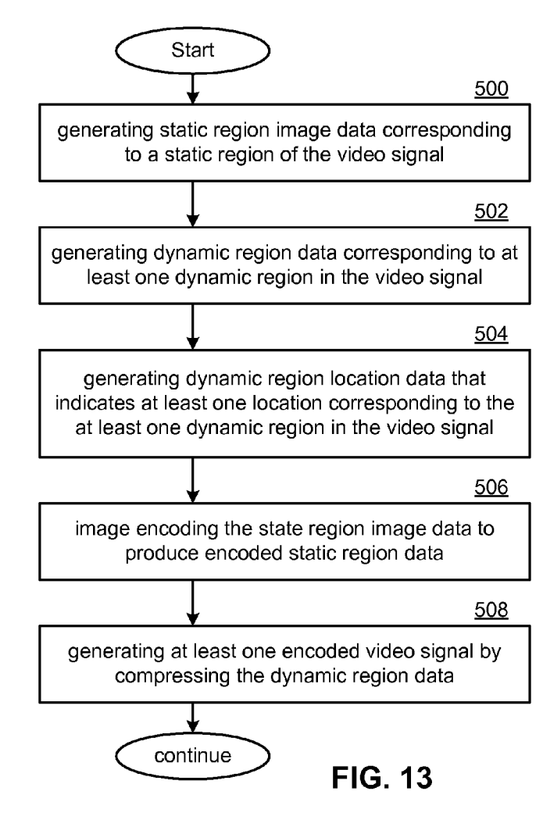
FIG. 13 presents a flowchart representation of a method in accordance with an embodiment of the present disclosure.

FIG. 13 presents a flowchart representation of a method in accordance with an embodiment of the present disclosure. In particular a method is presented for use in conjunction with one or more functions and features described in conjunction with FIGS. 1-12. Step 500 includes generating static region image data corresponding to a static region of the video signal. Step 502 includes generating dynamic region video data corresponding to at least one dynamic region in the video signal. Step 504 includes generating dynamic region location data that indicates at least one location corresponding to the at least one dynamic region in the video signal. Step 506 includes image encoding the static region image data to produce encoded static region data. Step 508 includes generating at least one encoded video signal by compressing the dynamic region video data. In an embodiment, the encoded static region data is formatted in accordance with a standard image compression format and wherein the at least one encoded video signal is encoded in conjunction with a standard video compression format.

Figure 14:
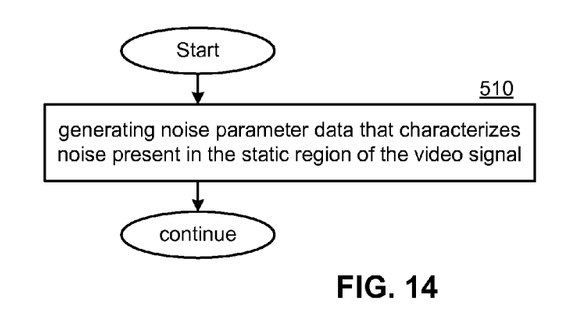
FIG. 14 presents a flowchart representation of a method in accordance with an embodiment of the present disclosure.

FIG. 14 presents a flowchart representation of a method in accordance with an embodiment of the present disclosure. In particular a method is presented for use in conjunction with one or more functions and features described in conjunction with FIGS. 1-13. In an embodiment, generating the static region image data includes noise filtering the static region of the video signal. Step 510 includes generating noise parameter data that characterizes noise present in the static region of the video signal.

Figure 15:
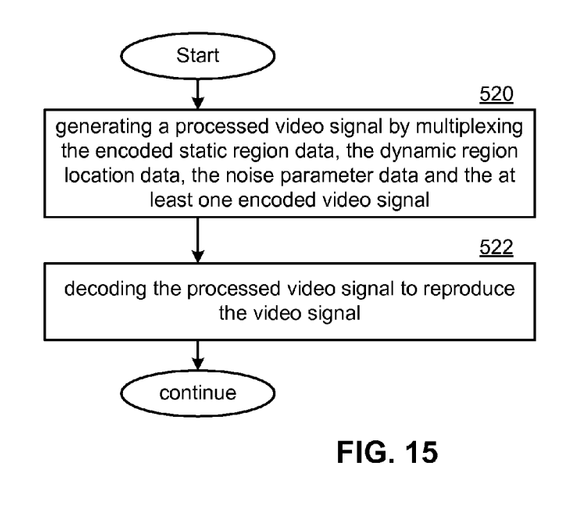
FIG. 15 presents a flowchart representation of a method in accordance with an embodiment of the present disclosure.

FIG. 15 presents a flowchart representation of a method in accordance with an embodiment of the present disclosure. In particular a method is presented for use in conjunction with one or more functions and features described in conjunction with FIGS. 1-14. Step 520 includes generating a processed video signal by multiplexing the encoded static region data, the dynamic region location data, the noise parameter data and the at least one encoded video signal. Step 522 includes decoding the processed video signal to reproduce the video signal.

Figure 16:
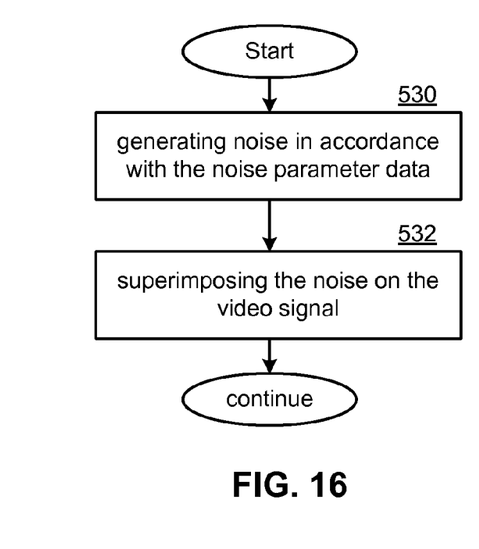
FIG. 16 presents a flowchart representation of a method in accordance with an embodiment of the present disclosure.

FIG. 16 presents a flowchart representation of a method in accordance with an embodiment of the present disclosure. In particular a method is presented for use in conjunction with one or more functions and features described in conjunction with FIGS. 1-15. Step 530 includes generating noise in accordance with the noise parameter data. Step 532 includes superimposing the noise on the video signal.

Figure 17:
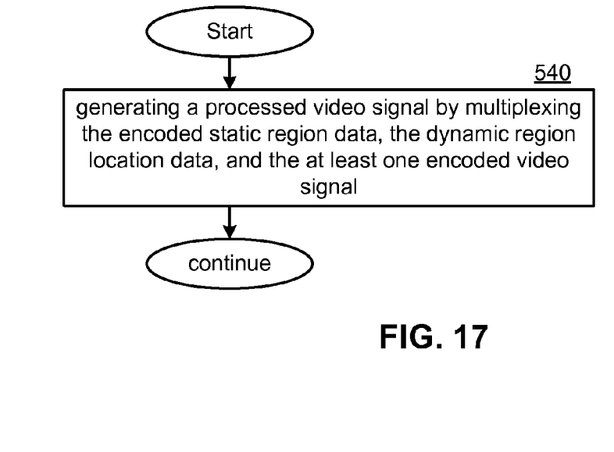
FIG. 17 presents a flowchart representation of a method in accordance with an embodiment of the present disclosure.

FIG. 17 presents a flowchart representation of a method in accordance with an embodiment of the present disclosure. In particular a method is presented for use in conjunction with one or more functions and features described in conjunction with FIGS. 1-16. Step 540 includes generating a processed video signal by multiplexing the encoded static region data, the dynamic region location data, and the at least one encoded video signal.

Figure 18:
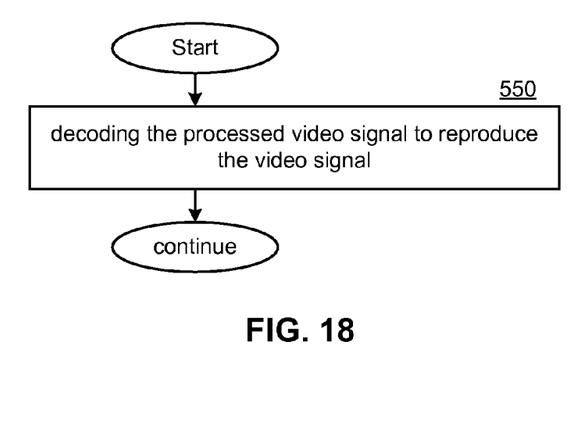
FIG. 18 presents a flowchart representation of a method in accordance with an embodiment of the present disclosure.

FIG. 18 presents a flowchart representation of a method in accordance with an embodiment of the present disclosure. In particular a method is presented for use in conjunction with one or more functions and features described in conjunction with FIGS. 1-17. Step 550 includes decoding the processed video signal to reproduce the video signal.

Figure 19:
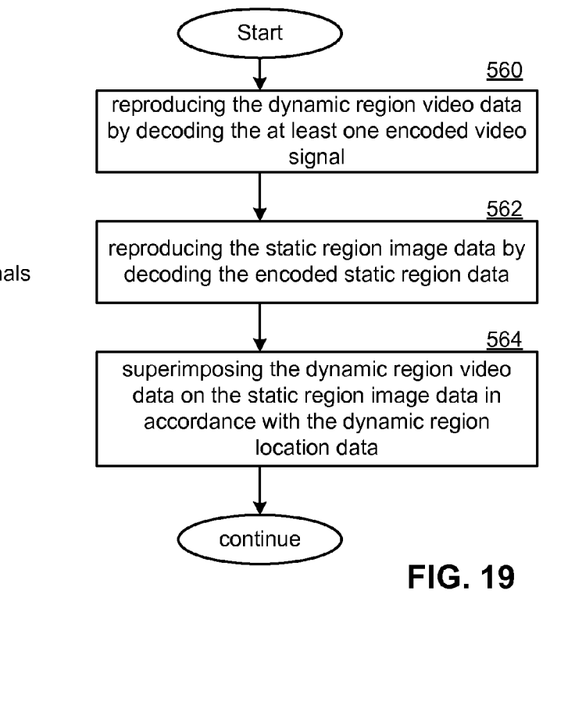
FIG. 19 presents a flowchart representation of a method in accordance with an embodiment of the present disclosure.

FIG. 19 presents a flowchart representation of a method in accordance with an embodiment of the present disclosure. In particular a method is presented for use in conjunction with one or more functions and features described in conjunction with FIGS. 1-18. Step 560 includes reproducing the dynamic region video data by decoding the at least one encoded video signal. Step 562 includes reproducing the static region image data by decoding the encoded static region data. Step 564 includes superimposing the dynamic region video data on the static region image data in accordance with the dynamic region location data.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A system for processing a video signal, the system comprising:
   a static region identification and separation module including processing hardware configured to:
   generate static region image data from the video signal, the static region image data corresponding to a static region of the video signal,
   generate dynamic region video data from the video signal, the dynamic region vidoe data corresponding to at least one dynamic region in the video signal, and
   generate dynamic region location data that indicates at least one location corresponding to the at least one dynamic region in the video signal,
   wherein the static region identification and separation module operates by:
     separating background image data in the static region from the video signal to generate the static region image data;
     detecting the at least one dynamic region in the video signal;
     cropping the dynamic region data in the at least one dynamic region from video signal to generate the dynamic region data; and
     generating the dynamic region location data from coordinates of the at least one dynamic region in the video signal;
   a static region encoding module, coupled to the static region identification and separation module, including encoding hardware configured to image encode the static region image data to produce encoded static region data in accordance with an image compression format; and
   a video encoder section, coupled to the static region identification and separation module, including a video encoder that generates at least one encoded video signal by compressing the dynamic region video data via a video encoding that is separate from the image encoding by the static region encoding module and wherein the video encoding is in accordance with a digital video codec standard that differs from the image compression format.

2. The system of claim 1 wherein the static region identification and separation module generates the static region image data by noise filtering the static region of the video signal and that further generates noise parameter data that characterizes noise present in the static region of the video signal.

3. The system of claim 2 further comprising:
   a signal interface, coupled to the static region identification and separation module, the static region encoding module and the video encoder section, that generates a processed video signal by multiplexing the encoded static region data, the dynamic region location data, the noise parameter data and the at least one encoded video signal, wherein the encoded static region data is multiplexed into the processed video signal only once during a session between a transmitting device that includes signal interface and a remote device; and
   a video decoder, coupled to receive the processed video signal at the remote device and to decode the processed video signal to reproduce the video signal at the remote device.

4. The system of claim 3 wherein the video decoder generates noise in accordance with the noise parameter data and superimposes the noise on the video signal.

5. The system of claim 1 further comprising:
   a signal interface, coupled to the static region identification and separation module, the static region encoding module and the video encoder section, that generates a processed video signal by multiplexing the encoded static region data, the dynamic region location data, and the at least one encoded video signal.

6. The system of claim 5 further comprising:
   a video decoder that decodes the processed video signal to reproduce the video signal.

7. The system of claim 6 wherein the video decoder includes:
   a video decoder section that reproduces the dynamic region video data from the at least one encoded video signal;
   a static region decoding module that reproduces the static region image data from the encoded static region data; and
   a static and dynamic region superposition module, coupled to the video decoder section and the static region decoding module, that superimposes the dynamic region video data on the static region image data in accordance with the dynamic region location data.

8. A method for processing a video signal, the method comprising:
   generating static region image data corresponding to a static region of the video signal by separating background image data in the static region from the video signal to generate the static region image data;
   generating dynamic region video data corresponding to at least one dynamic region in the video signal by detecting the at least one dynamic region in the video signal and cropping the dynamic region data in the at least one dynamic region from video signal to generate the dynamic region data;
   generating dynamic region location data that indicates at least one location corresponding to the at least one dynamic region in the video signal based on coordinates of the at least one dynamic region in the video signal;
   image encoding the static region image data to produce encoded static region data in accordance with an image compression format; and
   generating at least one encoded video signal by compressing the dynamic region video data via a video encoding that is separate from the image encoding and wherein the video encoding is in accordance with a digital video codec standard that differs from the image compression format.

9. The method of claim 8 wherein generating the static region image data includes noise filtering the static region of the video signal and wherein the method further comprises:

generating noise parameter data that characterizes noise present in the static region of the video signal.

10. The method of claim 9 further comprising:

generating a processed video signal by multiplexing the encoded static region data, the dynamic region location data, the noise parameter data and the at least one encoded video signal, wherein the encoded static region data is multiplexed into the processed video signal only once during a session between a transmitting device that includes signal interface and a remote device; and decoding the processed video signal at the remote device to reproduce the video signal at the remote device.

11. The method of claim 10 further comprising:

generating noise in accordance with the noise parameter data; and superimposing the noise on the video signal.

12. The method of claim 8 further comprising:

generating a processed video signal by multiplexing the encoded static region data, the dynamic region location data, and the at least one encoded video signal.

13. The method of claim 12 further comprising:

decoding the processed video signal to reproduce the video signal.

14. The method of claim 13 wherein decoding the processed video signal includes:

reproducing the dynamic region video data by decoding the at least one encoded video signal;

reproducing the static region image data by decoding the encoded static region data; and superimposing the dynamic region video data on the static region image data in accordance with the dynamic region location data.

* * * * *